United States Patent [19]
Kira

[11] Patent Number: 5,995,337
[45] Date of Patent: Nov. 30, 1999

[54] COMBINED THIN FILM MAGNETIC HEAD FORMED OVER A SUBSTRATE TRENCH

[75] Inventor: Tohru Kira, Tenri, Japan

[73] Assignee: Sharp Kabushiki Kaisha, Osaka, Japan

[21] Appl. No.: 08/221,999

[22] Filed: Apr. 4, 1994

Related U.S. Application Data

[63] Continuation of application No. 07/871,540, Apr. 21, 1992, abandoned.

[30] Foreign Application Priority Data

Apr. 22, 1991 [JP] Japan .................................. 3-090670

[51] Int. Cl.$^6$ ...................................................... G11B 5/39
[52] U.S. Cl. ............................ 360/113; 360/126; 360/121
[58] Field of Search .................................... 360/113, 121, 360/110, 126

[56] References Cited

U.S. PATENT DOCUMENTS 4,555,740  11/1985  Jackson et al. ........................ 360/113

*Primary Examiner*—Jefferson Evans

[57] ABSTRACT

A combined thin film magnetic head includes a first yoke magnetic head and a second type MR head a front gap is provided at a front end of the first yoke type MR head, and a second yoke type MR head is provided behind the first yoke type MR head. Consequently, the first yoke type MR head and the second yoke type MR head can be formed on the same substrate through the same process steps, and the number of manufacturing steps can be significantly reduced.

3 Claims, 14 Drawing Sheets

COMBINED THIN FILM MAGNETIC HEAD FORMED OVER A SUBSTRATE TRENCH

This application is a continuation, of applicaiton Ser. No. 07/871,540 filed on Apr. 21, 1992, now abandoned.

BACKGROUND OF THE INVENTION

1. Field of the Invention

The present invention relates to a combined thin film magnetic head used in a VTR or a DAT and, more specifically to a structure of a combined thin film magnetic head in which two or more thin film magnetic heads having overlapping track positions can be fabricated on the same substrate by the same manufacturing process.

2. Description of the Background Art

Recently, a DCC (Digital Compact Cassette) system formed of a stationary head type recorder and reproducer has come to be known as an audio recorder and reproducer for digital signals, which has broad compatibility with a compact cassette used for recording analog signals and is capable of recording and reproducing with tone quality as high as that of a compact disk.

The DCC system includes three different magnetic heads, which are (1), a multichannel head for analog reproduction, (2) a multichannel head for digital reproduction, and (3) a multichannel head for digital recording, as disclosed, for example, in Japanese Patent Laying-Open No. 2-232802.

The multichannel head for analog reproduction has 4 channels, the multichannel head for digital reproduction has 18 channels and the multichannel head for digital recording has 18 channels in order to cope with the automatic reversing mechanism.

An inductive thin film magnetic head is used as the multichannel head for digital recording. Magneto-resistive thin film magnetic heads (hereinafter referred to as MR heads) are used as the multichannel head for analog reproduction and the multichannel head for digital reproduction.

Referring to FIGS. 12 and 13 there is illustrated the structure of the MR head, on a substrate 51 formed of, for example, ferrite or alumina ceramics, a lower yoke 52 of highly permeable magnetic thin film such as Ni—Fe, FeAlSi, Co—Zr is formed. On the upper surface of lower yoke 52, interlayer insulating layers 54a and 54b having approximately trapezoidal cross sections are formed. A biasing lead 54 is arranged between interlayer insulating layers 54a and 54b.

A magneto-resistive element 55 is positioned at the top of the interlayer insulating layers 54a and 54b. Sensing current leads 57a and 57b are connected to magneto-resistive element 55.

An interlayer insulating layer 55a, which is a thin film, is formed on the top surface of magneto-resistive element 55 along the continuous surface of interlayer insulating layers 54a and 54b and of lower yoke 52. Upper yokes 58 and 59 of highly permeable magnetic thin films are formed on the top surface of the interlayer insulating layer 55a, providing a gap 53b above the magneto-resistive element 55.

At a front end which is brought into contact with and slides along a magnetic recording medium, upper yoke 58 and lower yoke 52 opposing each other with interlayer insulating layer 55a interposed therebetween as a gap layer, constitute a front gap 53 for picking up magnetic flux of the magnetic recording medium.

The operation of the MR head having the above described structure is as follows. Namely, variation of the magnetic flux of the magnetic recording medium from front gap 53 is guided to magneto-resistive element 55 at gap 53, and the variation of resistance because of magneto-resistive effect at magneto-resistive element 55 derived from the variation of the magnetic flux is taken by means of leads 57a and 57b.

When MR elements are used as the digital reproducing head and the analog reproducing head for the DCC system, the heads have track width and gap length very much different from each other as shown in Table 1.

TABLE 1

|  | recording head | reproducing head | |
|---|---|---|---|
|  |  | digital | analog |
| track number | 18 | 18 | 4 |
| track pitch | 195 μm | 195 μm | 900 μm |
| track width | 185 μm | 70 μm | 600 μm |
| length | 0.5 μm | 0.4 μm | 1.8 μm |
| recording wave length | 1–5 μm | 1–5 μm | 5–500 μm |

Therefore, it was impossible to use one head both as the digital reproducing head and an analog reproducing head.

In view of the foregoing, in one example of the conventional head configuration, a digital recording head 60, a digital reproducing head 62 and an analog reproducing head 64 are separately formed on separate head substrates, respectively, and the three head chips are combined with the track positions of the three head chips aligned, as shown in FIG. 14.

In this example, digital recording head 60, digital reproducing head 62 and analog reproducing head 64 are positioned in this order from the left, and the upper half a of each track and the lower half b of each track constitute head tracks corresponding to movement of the tape in the directions A and B in the figure, respectively.

Digital recording head 60 includes 18 recording head tracks 61. Digital reproducing head 62 includes 18 reproducing head tracks 63, and analog reproducing head 64 includes 4 reproducing head tracks 65.

A second example of the conventional head configuration is disclosed in Japanese Patent Laying-Open No. 3-250411. The content of this article will be described in the following.

Referring to FIG. 15, this example has a 2-chip configuration in which a digital recording head 67 is formed on one head chip 66, and a digital reproducing head 70 and an analog reproducing head 69 are formed on the same substrate of the other head chip 68.

The structure of the combined reproducing head 100 of this 2-chip configuration is formed in the following manner. Referring to FIG. 16, first, a yoke type MR head 100a for analog reproduction is formed on a substrate 71, a passivation layer 78 is formed thicker than the roughness of the yoke type MR head 100a for analog reproduction, and the roughness on the top surface is made flat by cutting or grinding. Thereafter, a yoke type MR head 100b for digital reproduction is further formed on the flattened passivation layer 78, and then a passivation layer 85 is further formed thereon. Thus, two reproducing heads are stacked on the same substrate.

However, the first example of the conventional head configuration has the following problem. As the density of magnetic recording has come to be higher and higher and the wavelength for recording becomes shorter and shorter recently, it becomes very important to minimize the spacing loss between the magnetic tape medium and the head. However, it is very difficult to minimize the spaces between the three heads and the magnetic tape surface in the first example of the prior art.

In addition, it is also very difficult to assemble the three head chips with the mutual track positions aligned with high precision. Since the cost of the head is proportional to the number of chips, the smaller number of chips is preferred in view of cost.

In other words, a head having two chips at most is desired as the head for the DCC system.

The second example of the prior art has two chips, and therefore it solves the above mentioned problem-of the chip number. However, the process for forming reproducing heads by thin films on the substrate takes at least twice as many steps for separately forming the digital reproducing head and the analog reproducing head. In addition, the total thickness of the thin films laminated on the substrate becomes is at least twice as thick. This increases the number of possible defects derived from increased strain of the substrate, and the thin film peeling between layers and entrance of dust. Consequently, production yields in the wafer process and in the assembly process are considerably decreased compared with the heads formed separately on the semiconductor substrates.

SUMMARY OF THE INVENTION

An object of the present invention is to provide a combined thin film magnetic head having a structure allowing the manufacture of a digital reproducing head and an analog reproducing head on the same substrate by the same manufacturing steps.

The above described object can be attained by the combined thin film magnetic head of the present invention including a first yoke type magneto-resistive head including a first upper yoke, a first lower yoke provided below the first upper yoke and a first front gap constituted by front end portions of the first upper yoke and the first lower yoke, the first front gap being in contact with and sliding up and down relatively with a magnetic recording medium for magnetic recording and reproducing; and a second yoke type magneto-resistive head including a second upper yoke provided continuous to the rear end of the first upper yoke, a second lower yoke provided below the second upper yoke to extend below the first upper yoke, and a second front gap constituted by front end portions of the first lower yoke and the second lower yoke, the second front gap being in contact with and sliding relative to the magnetic recording medium for magnetic recording and reproduction.

By the above described structure, the first yoke type MR head and the second yoke type magnetic head are arranged on the same substrate such that the first yoke type MR head is positioned on the side of the magnetic tape and the second yoke type MR head is disposed on the side opposing the tape rubbing surface of the first yoke type MR head, with respect to the sliding surface of the magnetic tape. Since the first lower yoke of the first yoke type MR head is magnetically connected to the second upper yoke of the second yoke type MR head, the first lower yoke of the first yoke type magnetic head serves as the second upper yoke of the second yoke type MR head. Therefore, the first yoke type magnetic head and the second yoke type MR head can be manufactured on the same substrate by the almost same manufacturing process, thus decreasing the number of manufacturing steps.

Preferably, the present invention includes a first lower yoke of a magnetic thin film formed approximately parallel to the surface of the substrate, a first interlayer insulating layer having an approximately trapezoidal cross section formed on the upper surface of the first lower yoke, a first magneto-resistive element formed on the upper portion of the first interlayer insulating layer, a second interlayer insulating layer formed as a thin film along a continuous surface of the first magneto-resistive element, the second interlayer insulating layer and the first lower yoke, and a first lower yoke of a magnetic thin film formed along the upper surface of the second interlayer insulating layer and having a first gap above the magneto-resistive element. At the front end portion constituting a surface which contacts and slides relative to the magnetic recording medium, the first upper yoke and the first lower yoke oppose to each other with the second interlayer insulating layer posed as a gap layer, thus providing a second front gap picking up magnetic flux of the magnetic recording medium, and hence providing a first yoke type MR head.

The second yoke type MR head includes a second lower yoke formed on the substrate surface and opposing to the first lower yoke with the third interlayer insulating layer posed therebetween, extending long behind the first lower yoke with the surface in contact with and sliding relative to the magnetic recording medium being the front end, a fourth interlayer insulating layer having an approximately trapezoidal cross section formed at a region behind the first lower yoke on the surface of the third interlayer insulating film, a second magneto-resistive element provided on the fourth interlayer insulating layer, a fifth interlayer insulating layer formed as a thin film along a continuous surface of the magneto-resistive element, the fourth interlayer insulating layer, the third interlayer insulating layer and the second lower yoke, and a second upper yoke of a magnetic thin film formed along the top surface of the fifth interlayer insulating layer and having a second gap on the second magneto-resistive element.

The first upper yoke and the second upper yoke are formed of the same layer of a magnetic thin film with the rear end of the former yoke being magnetically continuous to the former end of the latter. The first upper yoke and the second upper yoke may be made magnetically continuous with a magnetic layer interposed.

In the second yoke type magnetic head, the first lower yoke and the second upper yoke are combined to form the upper yoke, and the first lower yoke and the second lower yoke oppose to each other with the third interlayer insulating layer posed therebetween as a gap layer at a front end which serves as a surface in contact with and sliding relative to the magnetic recording medium, thus providing a second front gap picking up the magnetic flux of the magnetic recording medium.

By the above described structure, the first yoke type magnetic head serving as an digital reproduction head, and a second yoke type magnetic head serving as a analog reproducing head are arranged on the same substrate such that, with respect to the tape rubbing surface of the magnetic tape, the first yoke type magnetic head is positioned on the side of the magnetic tape, and the second yoke type MR head is positioned on the opposite side of the tape sliding surface of the first yoke type MR head. Since the first lower yoke of the first yoke type MR head is made continuous to the second upper yoke of the second yoke type MR head, the first lower yoke of the first yoke type MR head also serves as the second upper yoke of the second yoke type MR head. Therefore, the first yoke type magnetic head and the second yoke type MR head are formed by the same process on the same substrate, thereby reducing the number of manufacturing steps.

In the present invention, preferably, a trench portion or a pan is provided at a prescribed position of the substrate on which the first yoke type MR head and the second yoke type MR head are formed, and the first lower yoke is provided along the bottom portion of the trench. By this configuration, the space between the first lower yoke and the second lower yoke is widened, preventing decrease of head efficiency derived from leakage of magnetic flux between the first and second lower yokes.

In the present invention, preferably, a magnetic ferrite substrate is used as the substrate on which the first yoke type MR head and the second yoke type MR head are formed, whereby formation of the second lower yoke becomes unnecessary. This reduces the number of manufacturing steps of the combined thin film MR head.

In the present invention, preferably, a magnetic ferrite substrate is used as the substrate on which the first yoke type MR head and the second yoke type MR head are formed, a trench is provided at a prescribed position of the substrate, and a non-magnetic body is filled in the trench. This reduces the number of manufacturing steps of the combined thin film magnetic head and the formation of the second lower yoke becomes unnecessary, and the distance between the first lower yoke and the substrate is made longer, thereby preventing decrease of head efficiently derived from leakage of magnetic flux between the first lower yoke and the substrate.

As described above, according to the present invention, the first yoke type MR head and the second yoke type MR head on arranged such that the second yoke type MR head is positioned behind the first yoke type MR head with a magnetic tape positioned at a front end portion of the first yoke type MR head, with respect to the magnetic tape rubbing surface. Consequently, the first and second yoke type MR heads can be simultaneously formed, significantly reducing the number of manufacturing steps, and in addition, since the number of manufacturing steps can be reduced, increase of the deformation of the substrate, the problem of peeling between layers, the rate of defects caused by entrance of dusts and the like can be significantly reduced.

Further, since a trench portion is provided in the substrate on which the first and second yoke type MR heads are formed, decrease of efficiency in reproduction by the head caused by leakage of the magnetic fluxes between the first and second lower yokes can be prevented, thus providing a highly reliable combined thin film magnetic head.

Since a magnetic ferrite substrate is used as the substrate on which the first and second yoke type MR heads are formed, it becomes unnecessary to form the second lower yoke, which further reduces the number of the manufacturing steps.

Further, since a magnetic ferrite substrate is used as the substrate on which the combined thin film magnetic head is formed and a trench portion is provided immediately below the region where the first and second yoke type MR heads are formed, decrease of the head reproducing efficiency derived from leakage of magnetic flux between the first lower yoke and the substrate can be prevented, providing a highly reliable combined thin film magnetic head at lower cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A first embodiment of the combined thin film magnetic head in accordance with the present invention will be described in the following with reference to FIGS. 1 to 4.

The combined thin film magnetic head 200 of this embodiment includes a first yoke type magneto-resistive head 200a serving as a magnetic head for digital reproduction, and a second yoke type magneto-resistive head 200b serving as a magnetic head for analog reproduction.

The combined thin film magnetic head 200 includes a first yoke type MR head 200a and a second yoke type MR head 200b formed on the same substrate, wherein second yoke type magnetic head 200b has at least a portion of a recording and reproducing track overlapped with the first yoke 200a, and a recording and reproducing track which is longer than the first yoke type MR head 200a.

Figure 1:
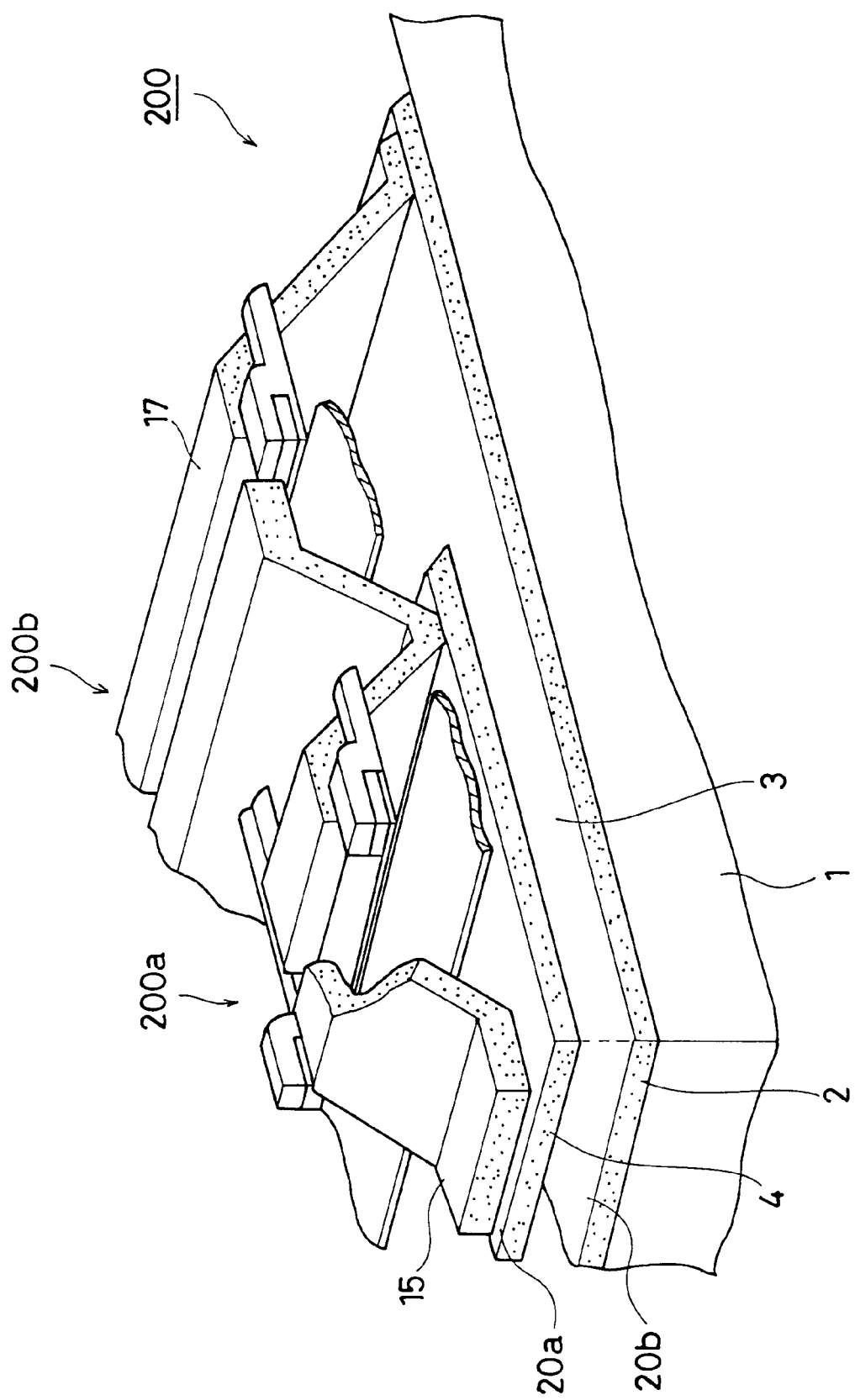
FIG. 1 is a perspective view of the combined thin film magnetic head in accordance with one embodiment of the present invention.
Figure 2:
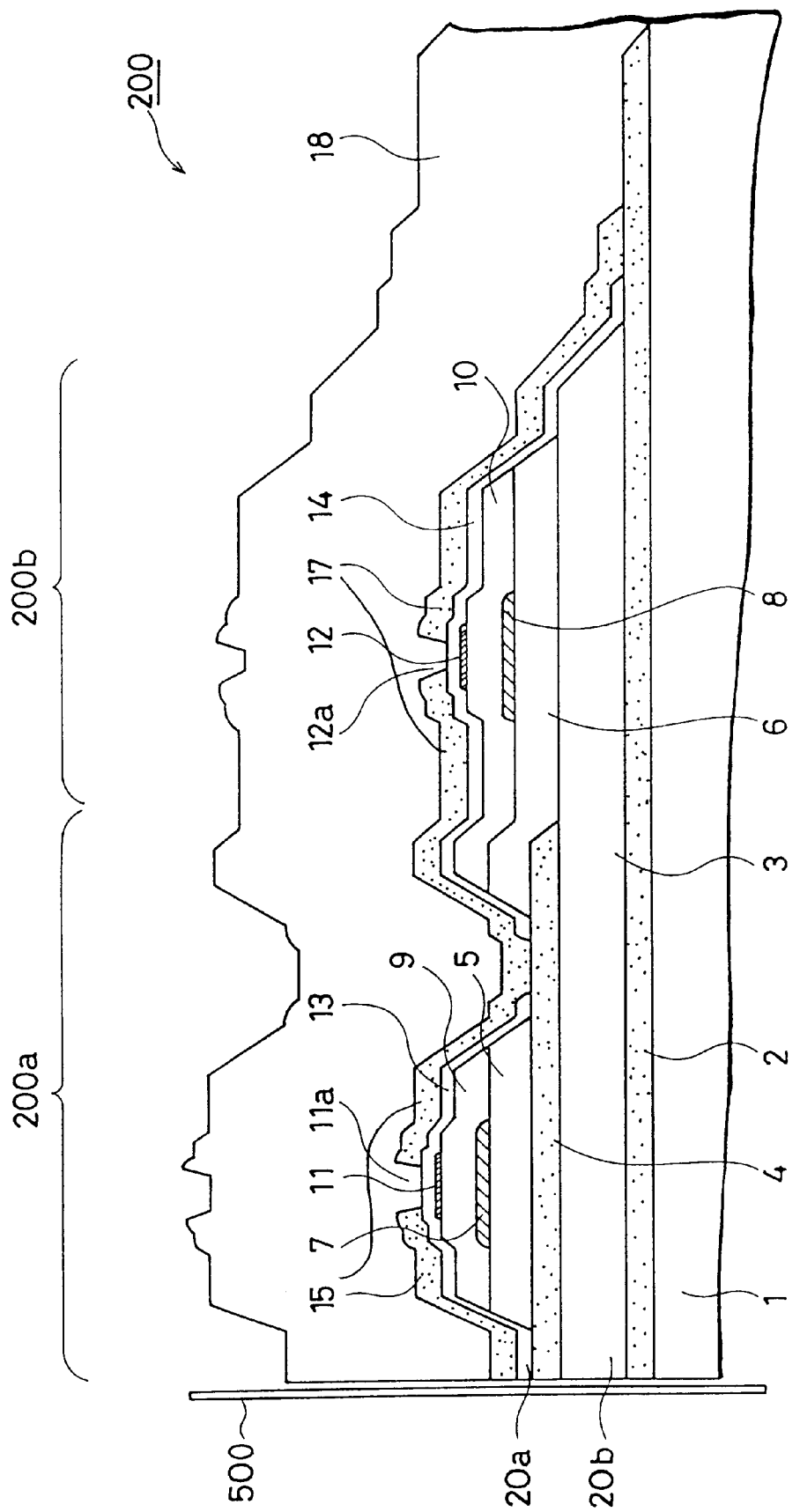
FIG. 2 is a cross sectional view of the combined thin film magnetic head in accordance with the first embodiment of the present invention.

The first yoke type MR head 200a has a first lower yoke 4 of a magnetic thin film formed approximately parallel to the substrate 1 of ferrite or alumina ceramics, as shown in FIG. 2.

On the upper surface of the first lower yoke 4, interlayer insulating layers 5 and 9 having approximately trapezoidal cross sections are formed, and a biasing lead 7 is formed between interlayer insulating layers 5 and 9.

At the top of the interlayer insulating layer 9, a first magneto-resistive element 11 is provided. A second interlayer insulating layer 13 is formed as a thin film along a continuous surface of the magneto-resistive element 11, interlayer insulating layers 5 and 9 and of the first lower yoke 4.

Further, a first upper yoke 15 of a magnetic thin film is formed along the second interlayer insulating layer 13.

At the front end portion providing a surface which is in contact with and sliding relative to a magnetic tape 500 as a magnetic recording medium, the first upper yoke 15 oppose to the first lower yoke 4 with the second interlayer insulating layer 13 interposed, thus constituting a first front gap 20a for picking up magnetic flux from the magnetic tape 500.

The second yoke type MR head 200b has a second lower yoke 2 formed on the surface of the substrate 1 and opposing to the first lower yoke 4 with the third interlayer insulating layer 3 interposed and extending long behind the first lower yoke, the front end portion thereof being a surface to be in contact with and sliding relative to the magnetic tape 500.

Interlayer insulating layers 6 and 10 having approximately trapezoidal cross sections are formed at a region behind the first lower yoke on the upper surface of the third interlayer insulating layer 3, and a biasing lead 8 is formed between the interlayer insulating layers 6 and 10.

A second magneto-resistive element 12 is provided at the top of the interlayer insulating layer 10, and a fifth interlayer insulating layer 14 is formed as a thin film along a continuous upper surface of the magneto-resistive element 12, the interlayer insulating layer 6 and 10 and of the second lower yoke 2.

Further, along the upper surface of the fifth interlayer insulating layer 14, a second upper yoke 17 of a magnetic thin film is formed provided above the second magneto-resistive element 12.

The first upper yoke 15 and the second upper yoke 17 are formed continously by joining the rear end of the former and the front end of the latter.

Further, in the second yoke type MR head 200b, the first lower yoke 4 and the second upper yoke 17 are combined to form the upper yoke, and at the front end portion serving as a surface which is in contact with and sliding relative to the magnetic tape 500, the first lower yoke 4 and the second lower yoke 2 oppose to each other with the third interlayer insulating layer 3 interposed as a gap layer, whereby a second front gap 20b picking up the magnetic flux of the magnetic tape 500 is provided.

A passivation layer 18 is deposited to cover the upper surfaces of the first yoke type MR head 200a and the second yoke type magnetic head 200b.

Figure 3:
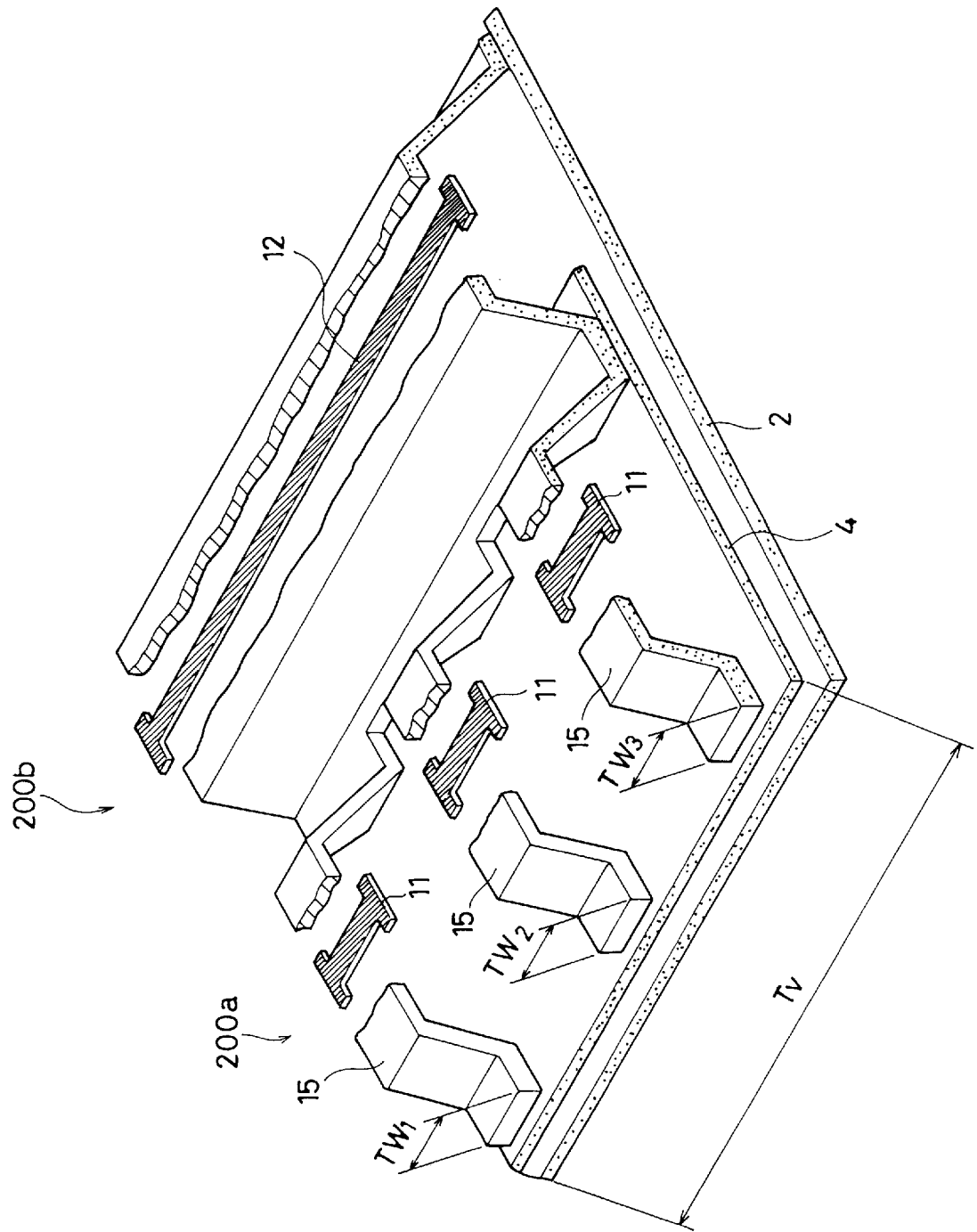
FIG. 3 is a perspective view showing arrangement of the first magneto-resistive element and the second magneto-resistive element of the combined thin film magnetic head in accordance with one embodiment of the present invention.

FIG. 3 is a perspective view extracting portions of the first magneto-resistive element 11 and the second magneto-resistive element 12.

Referring to the figure, the reference character $T_v$ denotes track width of the second yoke type MR head 200b, and the track width $T_v$ is defined by the width of the first lower yoke 4. The reference characters $T_{w1}$, $T_{w2}$ and $T_{w3}$ denote track width of the first yoke type MR head 200a, which is defined by the width of the first upper yoke 15.

Since the upper yoke is formed by combining the first lower yoke 4 and the second upper yoke 17 in the second yoke type MR head 200b, an analog signal introduced from magnetic tape 500 to the first lower yoke 4 is guided from the first lower yoke 4 through the second upper yoke 17 to the second magneto-resistive element 12. More specifically, the second yoke type MR head 200b constitutes a closed magnetic circuit of the first lower yoke 4 → the second upper yoke 17 → the second lower yoke 2.

The first yoke type magnetic head 200a forms a closed magnetic circuit of the first upper yoke 15 → the first lower yoke 4.

The method of manufacturing the combined thin film magnetic head 200 is as follows. On a substrate 1 of ferrite or alumina ceramics or the like, a highly permeable magnetic thin film such as Ni—Fe, FeAlSi, Co—Zr or the like is formed by sputtering or plating, photo-etching employing RIE (Reactive Ion Etching) or the like is carried out to provide a prescribed pattern and a second lower yoke 2 is formed. At this time, the width of the second lower yoke 2 is made wider than the track width $T_v$ of the second yoke type MR head 200b.

Then, a third interlayer insulating layer 3 which has the same thickness as the second front gap 200b and the same width as track width $T_v$ necessary for the second yoke type MR head 200b is formed by sputtering or CVD (chemical vapor depostion) of $SiO_2$, $Al_2O_3$, SiN or the like.

Then, the first lower yoke 4 is formed by the same method as the second lower yoke 2.

At this time, the width of the first lower yoke 4 at the surface of the magnetic tape 500 is selected to be the same as the track width $T_v$ of the second yoke type magnetic head 200b.

Then, the first interlayer insulating layer 5 and the fourth interlayer insulating layer 6 are formed by $SiO_2$, $Al_2O_3$, SiN or the like by sputtering or CVD.

Further, a thin film of Al, Cu, Ag, Au or the like is formed on these layers by means of vapor deposition, sputtering, CVD or plating, so as to form bias leads 7 and 8 by photo etching.

Further, $Al_2O_3$, SiN or the like is formed by sputtering or CVD or the like on the top surfaces of the bias leads 7 and 8, so as to complete the first interlayer insulating layers 5 and 9 and the fourth interlayer insulating layers 6 and 10.

Thereafter, at the top of the first interlayer insulating layer 5 and 9 and of the fourth interlayer insulating layers 6 and 10, magneto-resistive elements 11 and 12 are formed, respectively, by forming a film of Ni—Fe, Ni—Fe—Co or the like by vapor deposition or sputtering, and by photo etching thereafter.

Thereafter, on the surfaces of the magneto-resistive elements 11 and 12, the first interlayer insulating layers 5 and 9 and of the fourth interlayer insulating layers 6 and 10, the third interlayer insulating layer 13 and fifth interlayer insulating layer 14 are formed. Then, a highly permeable magnetic film is formed on the upper surfaces of the third and fifth interlayer insulating layers 13 and 14, so as to provide the first and second upper yokes 15 and 17. Then, by means of RIE or plasma etching, upper portions of the first magneto-resistive element 11 and of the second magneto-resistive element 12 are removed to form the first and second gap portions 11a and 12a, respectively.

Figure 4:
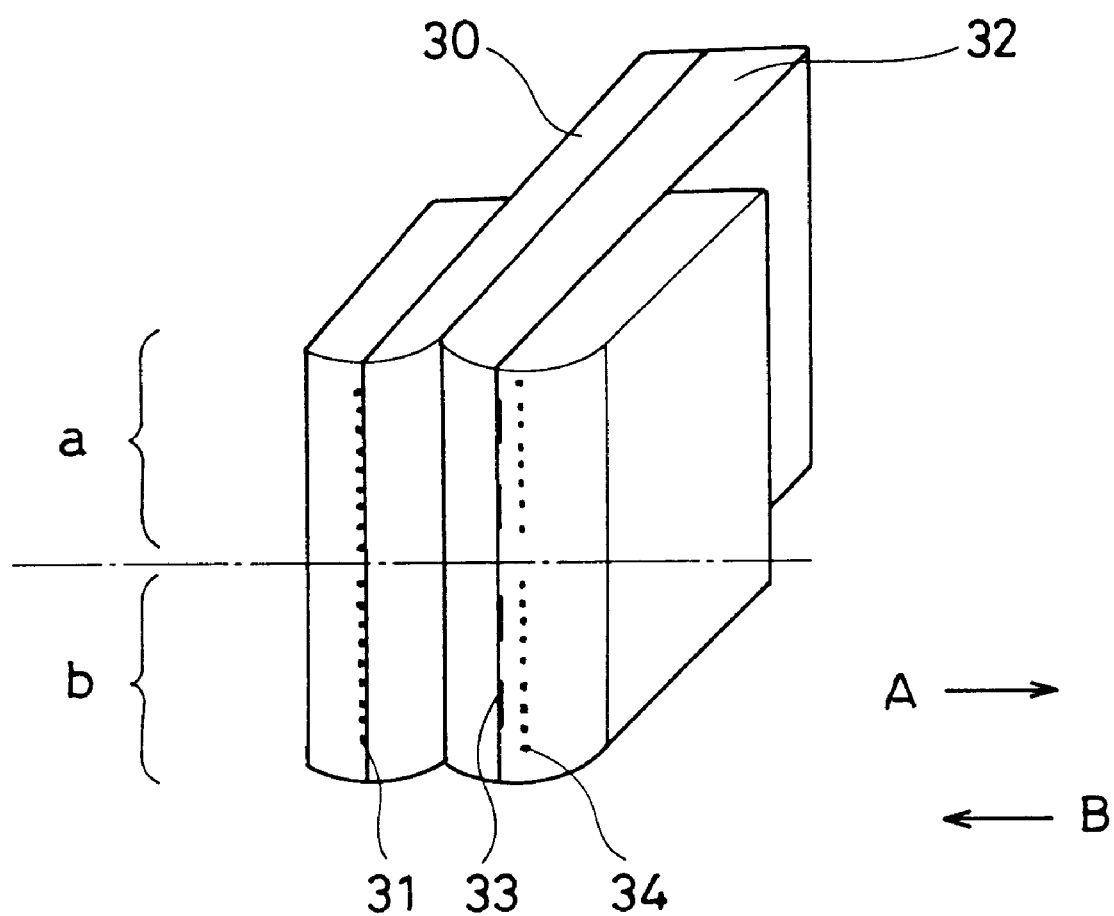
FIG. 4 is a perspective view of a head chip employing the combined thin film magnetic head in accordance with the first embodiment of the present invention.

Then, a passivation layer 18 is formed on the upper surfaces, and thus the combined thin film magnetic head is completed. One embodiment of a head chip employing the combined thin film magnetic head has a 2-chip configuration such as shown in FIG. 4 in which a digital recording head 31 is formed on one head chip 30, and a digital reproduction head 34 and an analog reproduction head 33 formed on the same substrate of the other head chips 32.

By the present structure, all the structural components except the first lower yoke 4 and the third interlayer insulating layer 3 can be simultaneously formed by the same thin films and the same etching steps, as described above. Therefore, the first yoke type MR head and the second yoke type MR head can be simultaneously formed on the same substrate through approximately the same manufacturing steps as those of manufacturing a conventional yoke type MR head. Therefore, compared with the steps for manufacturing a conventional combined thin film magnetic head, the number of steps can be reduced to about one half, which is a considerable reduction.

Figure 5:
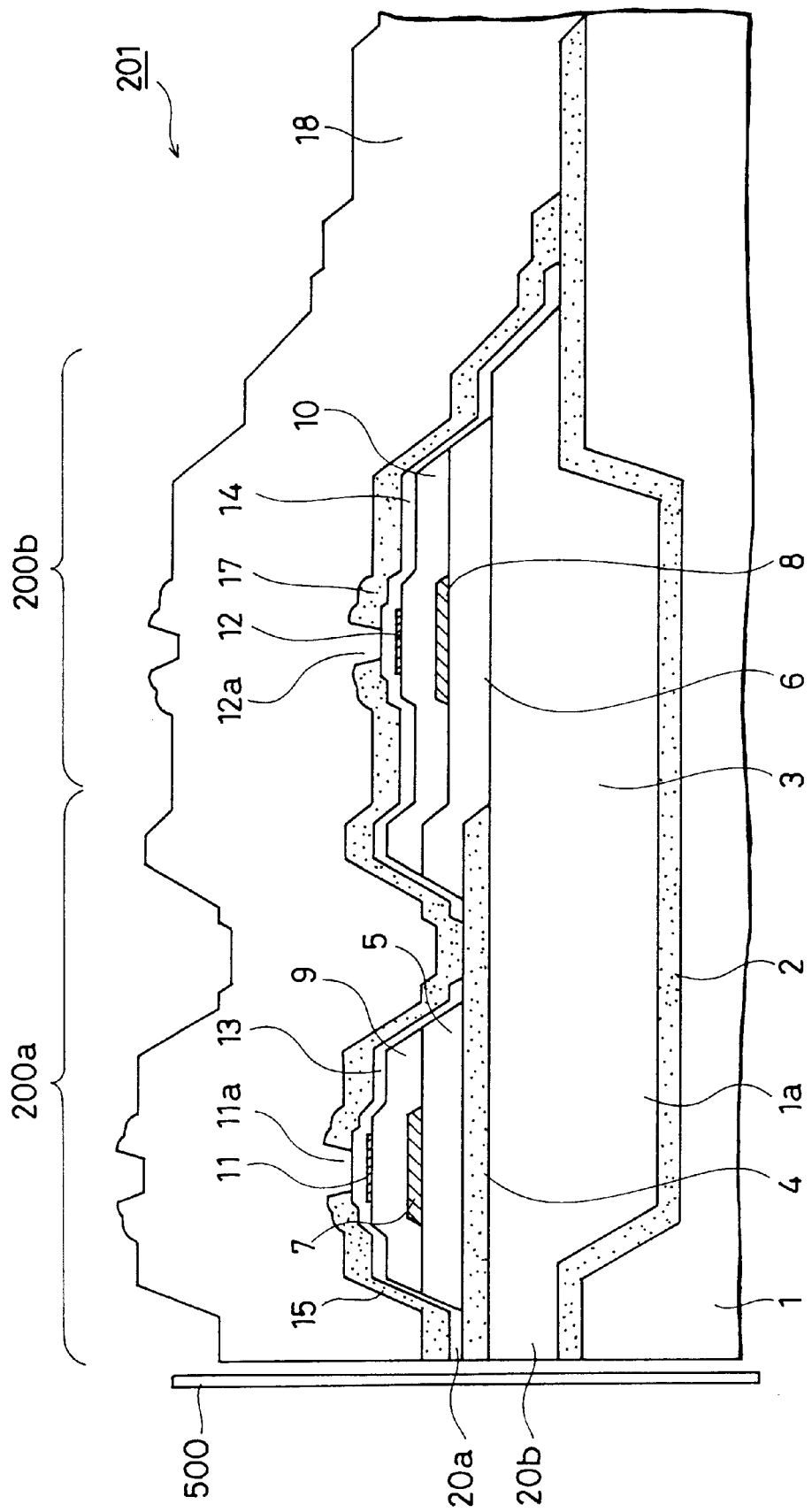
FIG. 5 is a cross sectional view of the combined thin film magnetic head in accordance with a second embodiment of the present invention.

In the combined thin film magnetic head 201 in accordance with the second embodiment of the present invention, a trench potion 1a having a prescribed depth is provided in the substrate 1 on which the combined thin film magnetic head of the first embodiment is formed, at a region immediately below the first and second yoke type MR heads 200a and 200b, and the second lower yoke 2 is formed along the bottom portion of the trench 1a, as shown in FIG. 5.

Therefore, the distance between the first lower yoke 4 and the second lower yoke 2 is made longer. Consequently, decrease of the reproduction efficiency of the head because of leakage of the magnetic flux between the first lower yoke 4 and the second lower yoke 2, derived from long distance between the second front gap 20b to the second yoke type MR head 200b, can be prevented.

Figure 6:
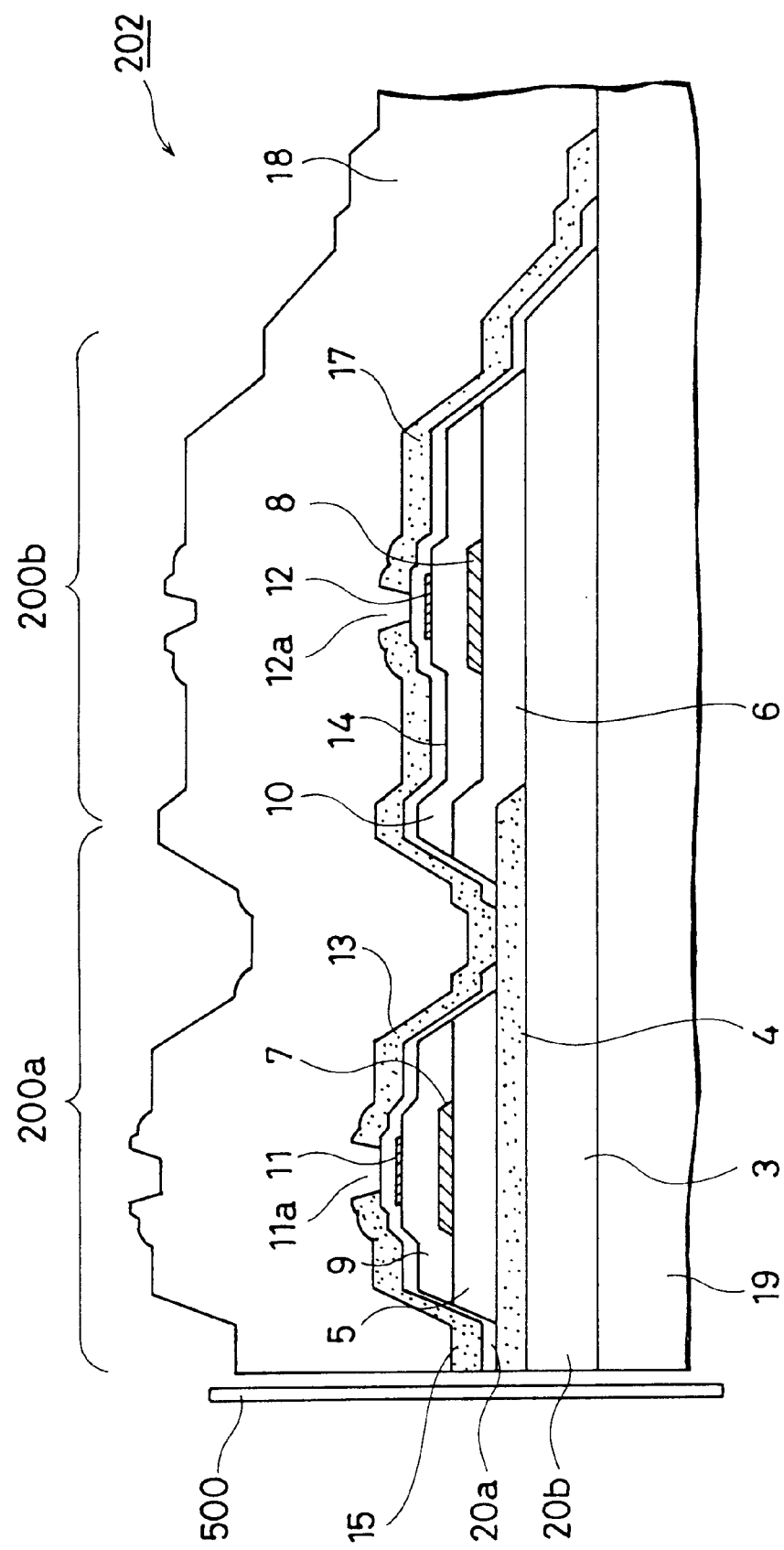
FIG. 6 is a cross sectional view of the combined thin film magnetic head in accordance with a third embodiment of the present invention.

In the combined thin film magnetic head 202 of the third embodiment of the present invention, a magnetic ferrite substrate 19 such as Mn—Zn ferrite or Ni—Zn ferrite is used as the substrate on which the thin film magnetic heads of the first embodiment are formed, as shown in FIG. 6. Since the substrate 19 serves as the second lower yoke 2, it becomes unnecessary to form the second lower yoke.

Therefore, the number of manufacturing steps can be further reduced, deformation of the substrate can be prevented, peeling between layers can be suppressed, and the rate of defects derived from entrance of dust or the like can be made smaller.

Figure 7:
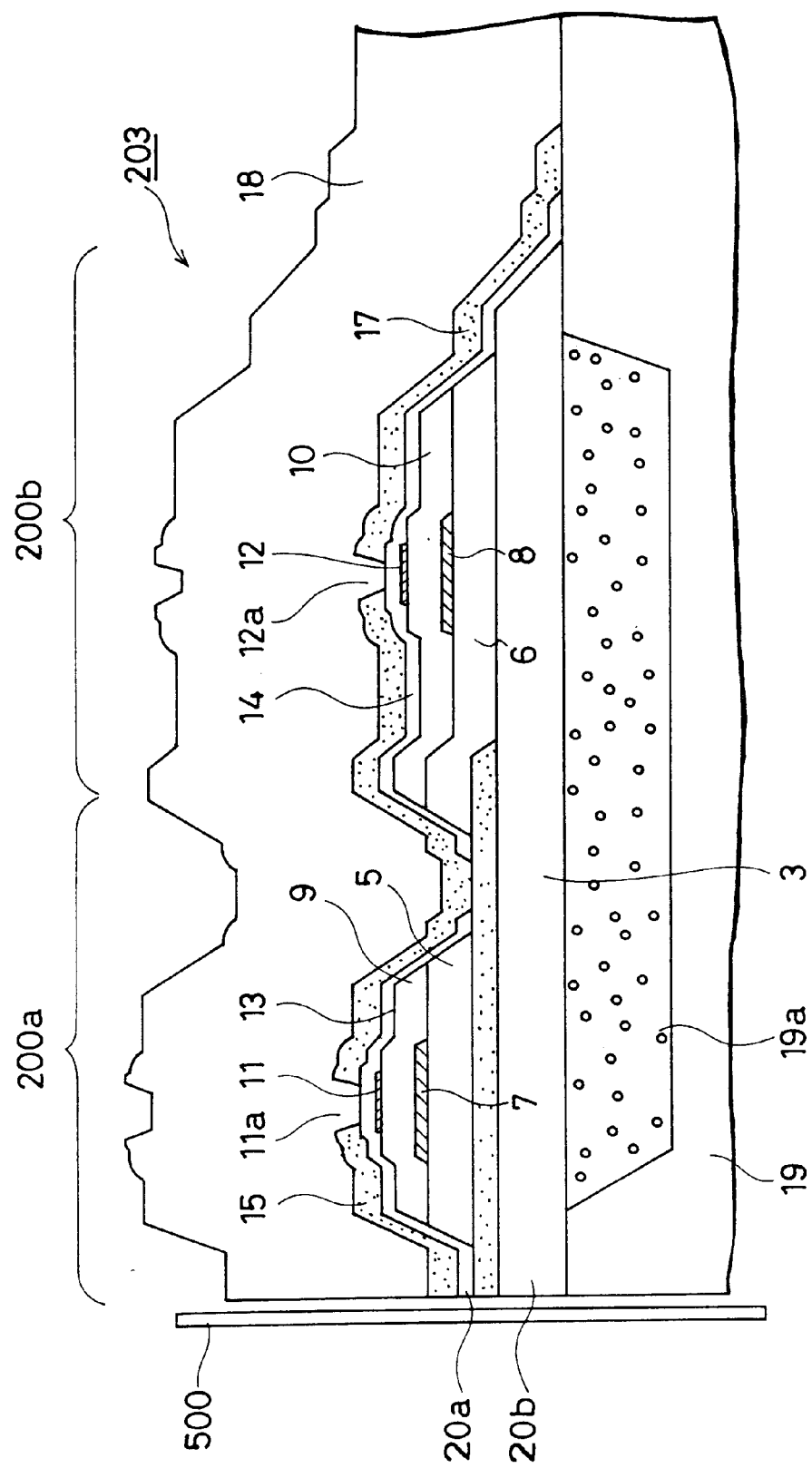
FIG. 7 is a cross section of the combined thin film magnetic head in accordance with the fourth embodiment of the present invention.

In the combined thin film magnetic head 203 in accordance with the fourth embodiment of the present invention, a magnetic ferrite substrate 19 of Mn—Zn ferrite or Ni—Zn ferrite is used as the substrate on which the combined thin film magnetic head of the first embodiment is formed, and a trench portion 19a is provided at a region immediately below the first and second yoke type MR heads, as shown in FIG. 7. Further, a non-magnetic body such as glass, $SiO_2$, $Al_2O_3$ or polyimide is filled in this portion.

Accordingly, the substrate 19 serves as the second lower yoke 2, making it unnecessary to form the second lower yoke 2, and the number of manufacturing steps can be reduced. Since the distance between the second front gap 20b and the second yoke type magnetic head 200b is long, decrease of the efficiency of the head derived from leakage of magnetic flux can be prevented.

Figure 8:
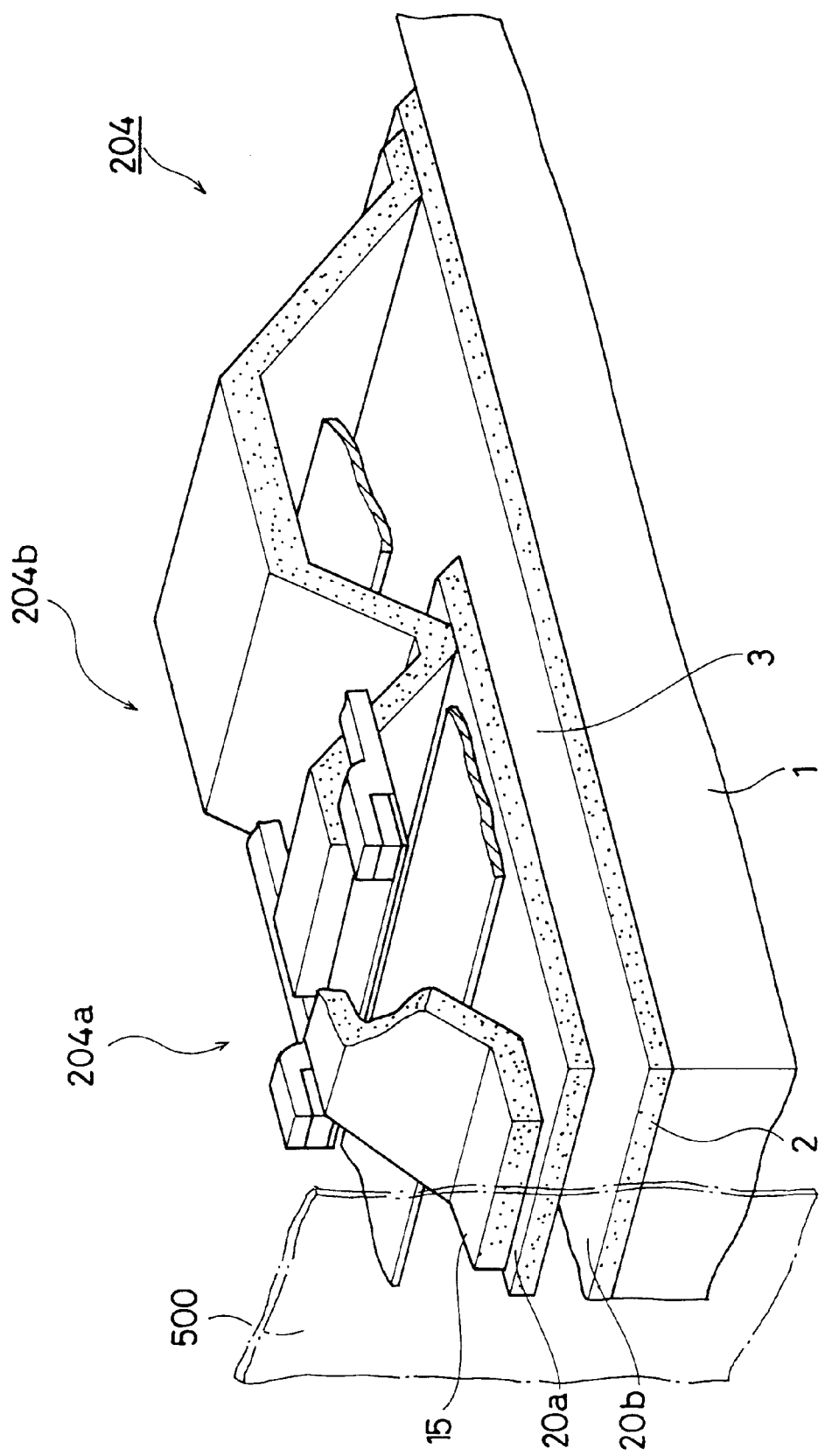
FIG. 8 is a perspective view of the combined thin flm magnetic head in accordance with the fifth embodiment of the present invention.
Figure 9:
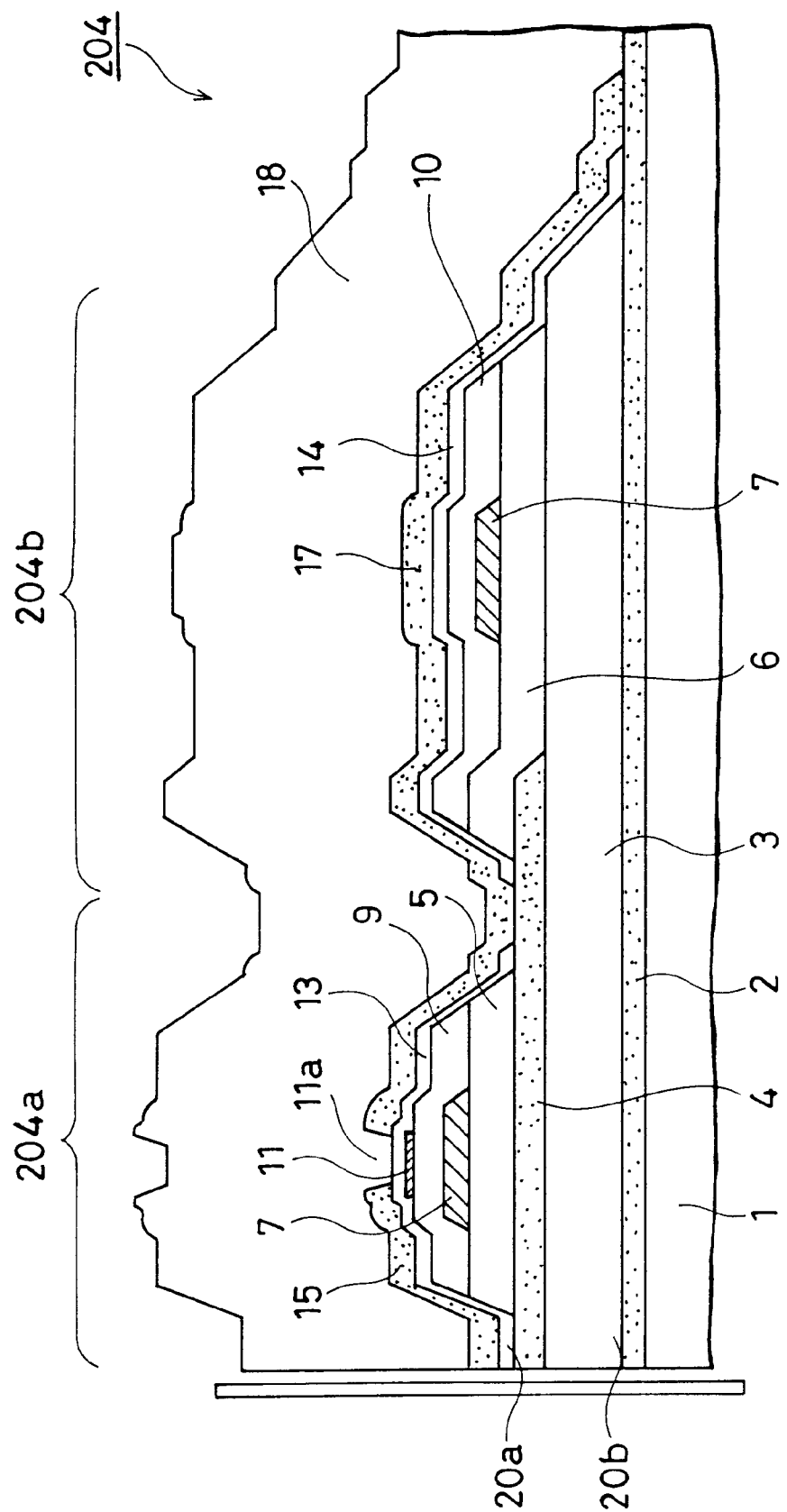
FIG. 9 is a cross sectional view of the combined thin film magnetic head in accordance with the fifth embodiment of the present invention.

A combined thin film magnetic head 204 in accordance with a fifth embodiment of the present invention will be described with reference to FIGS. 8 and 9. The combined thin film magnetic head 204 of this embodiment includes a thin film magnetic head 204a for recording and a thin film magnetic head 204b for reproducing provided on the same substrate.

Figure 10:
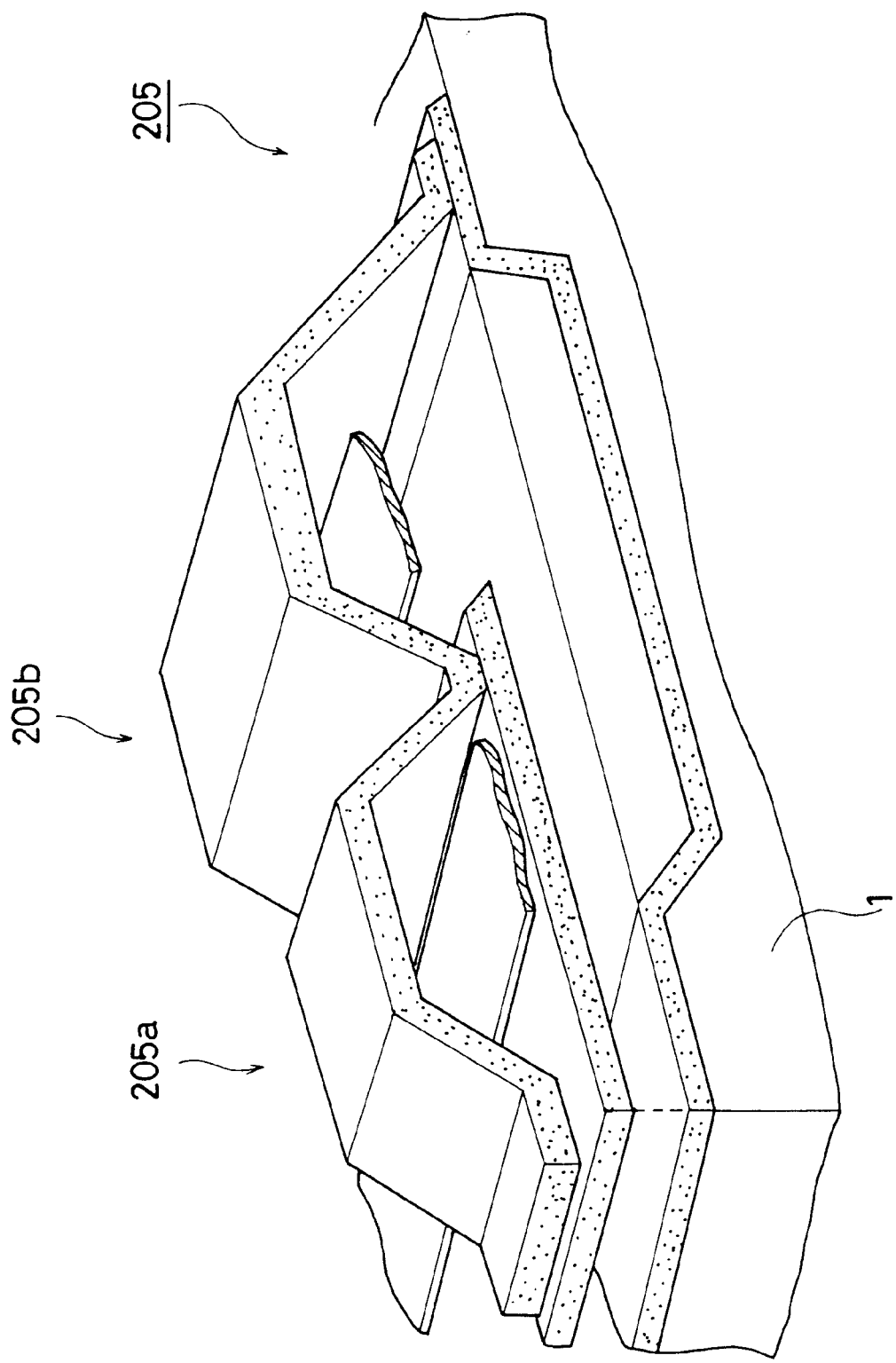
FIG. 10 is a perspective view of the combined thin film magnetic head in accordance with the sixth embodiment of the present invention.
Figure 11:
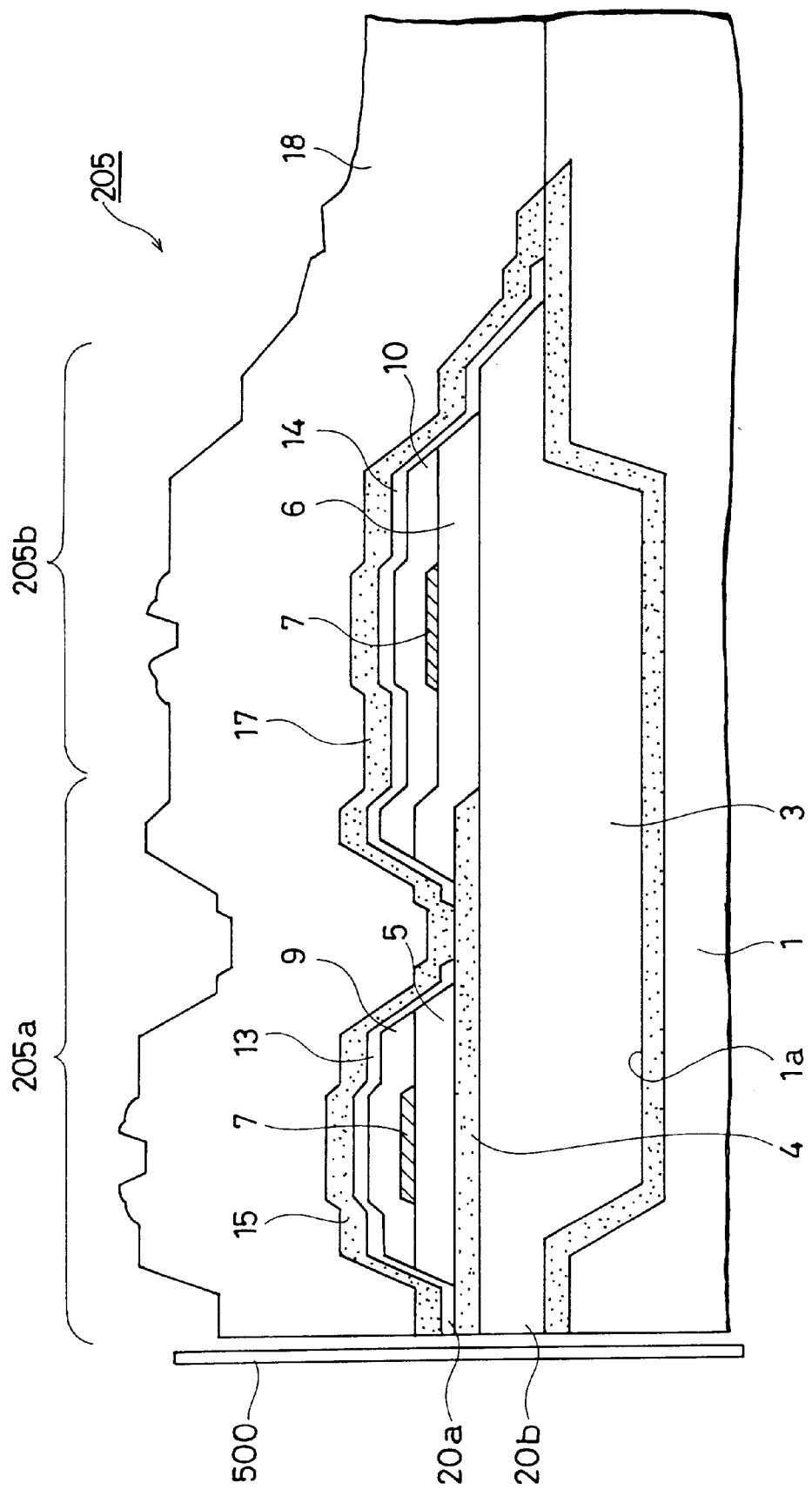
FIG. 11 is a cross sectional view of the combined thin film magnetic head in accordance with the sixth embodiment of the present invention.
Figure 12:
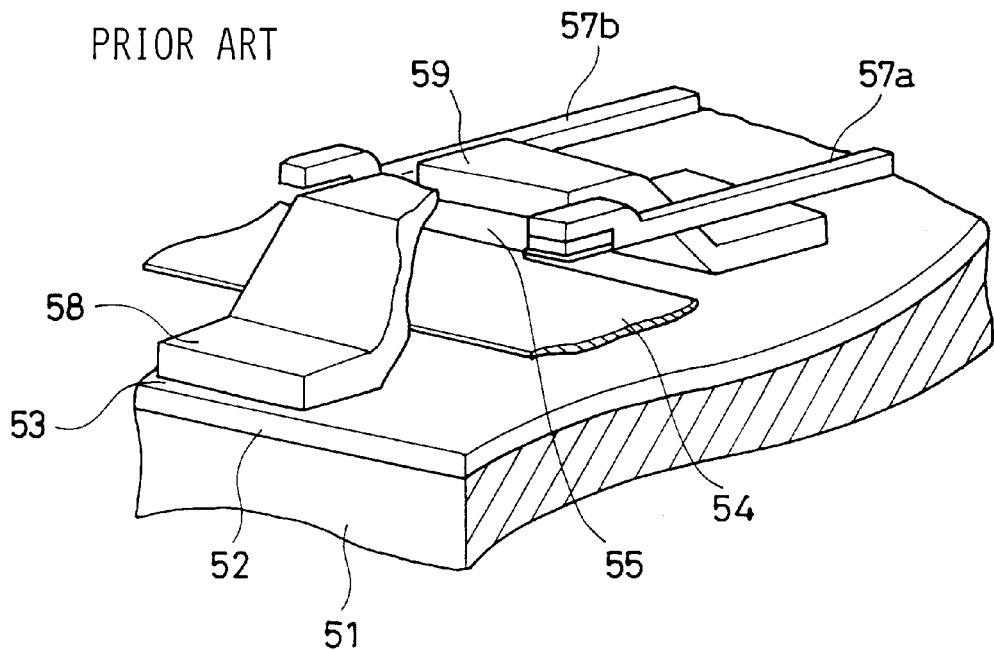
FIG. 12 is a perspective view of the thin film magnetic head of the prior art.
Figure 13:
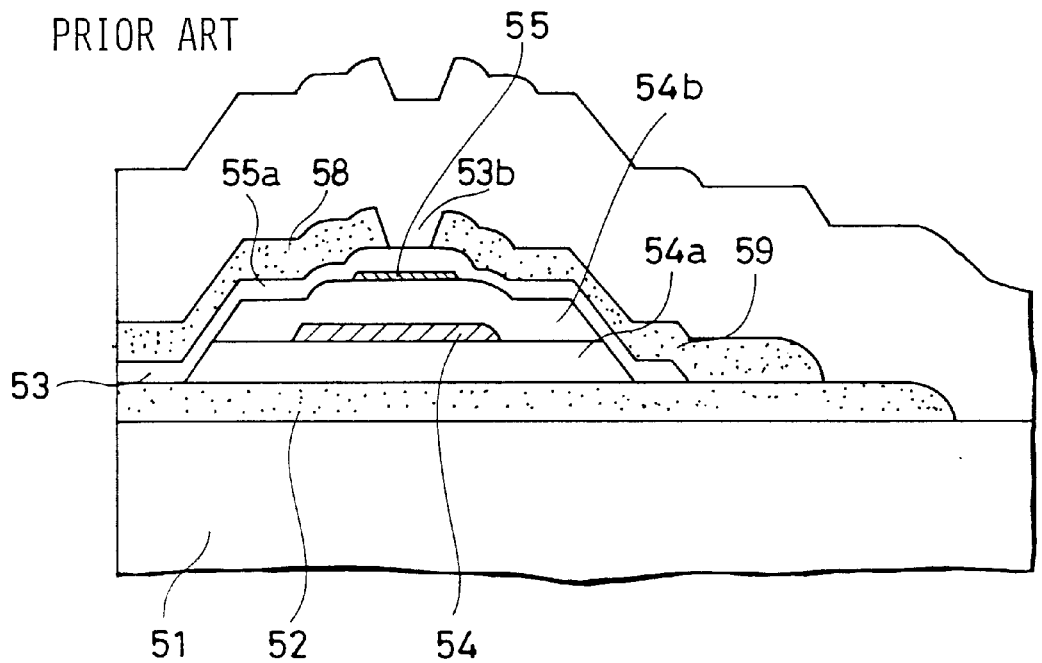
FIG. 13 is a cross sectional view of a conventional thin film magnetic head.
Figure 14:
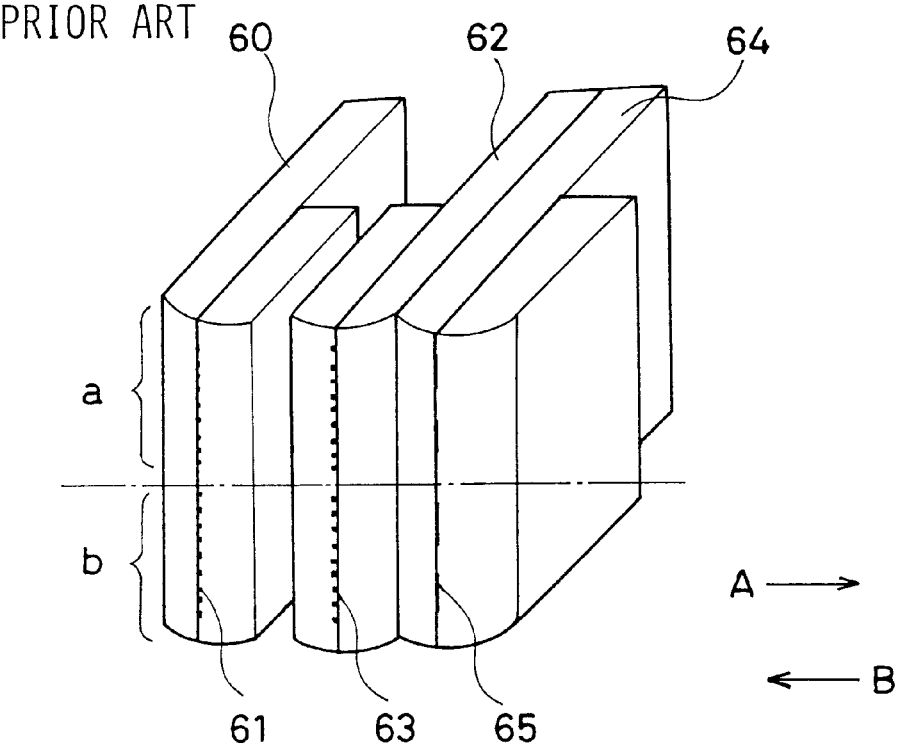
FIG. 14 is a perspective view showing an example of a magnetic head employing a conventional thin film magnetic head.
Figure 15:
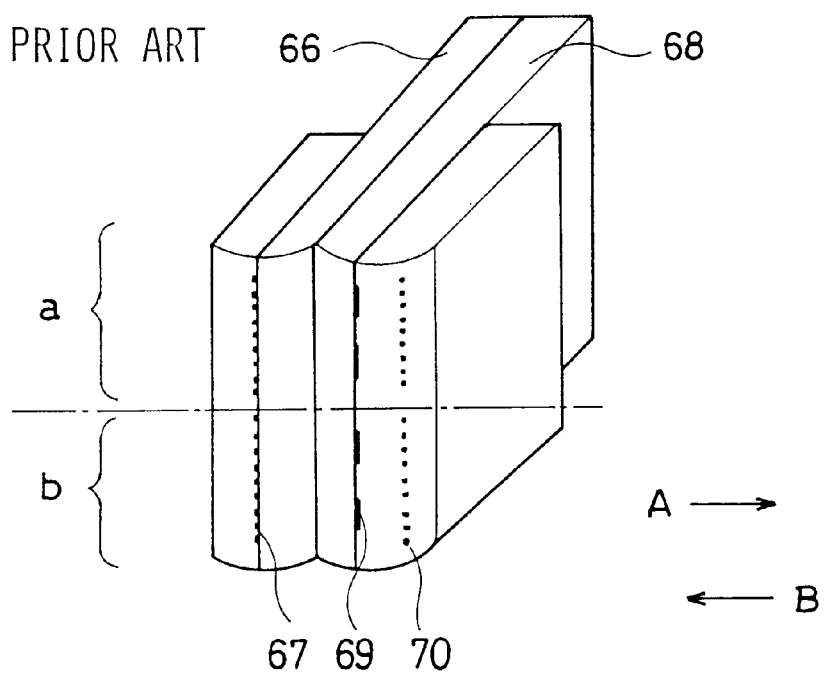
FIG. 15 is a perspective view of a magnetic head employing a conventional combined thin film magnetic head.
Figure 16:
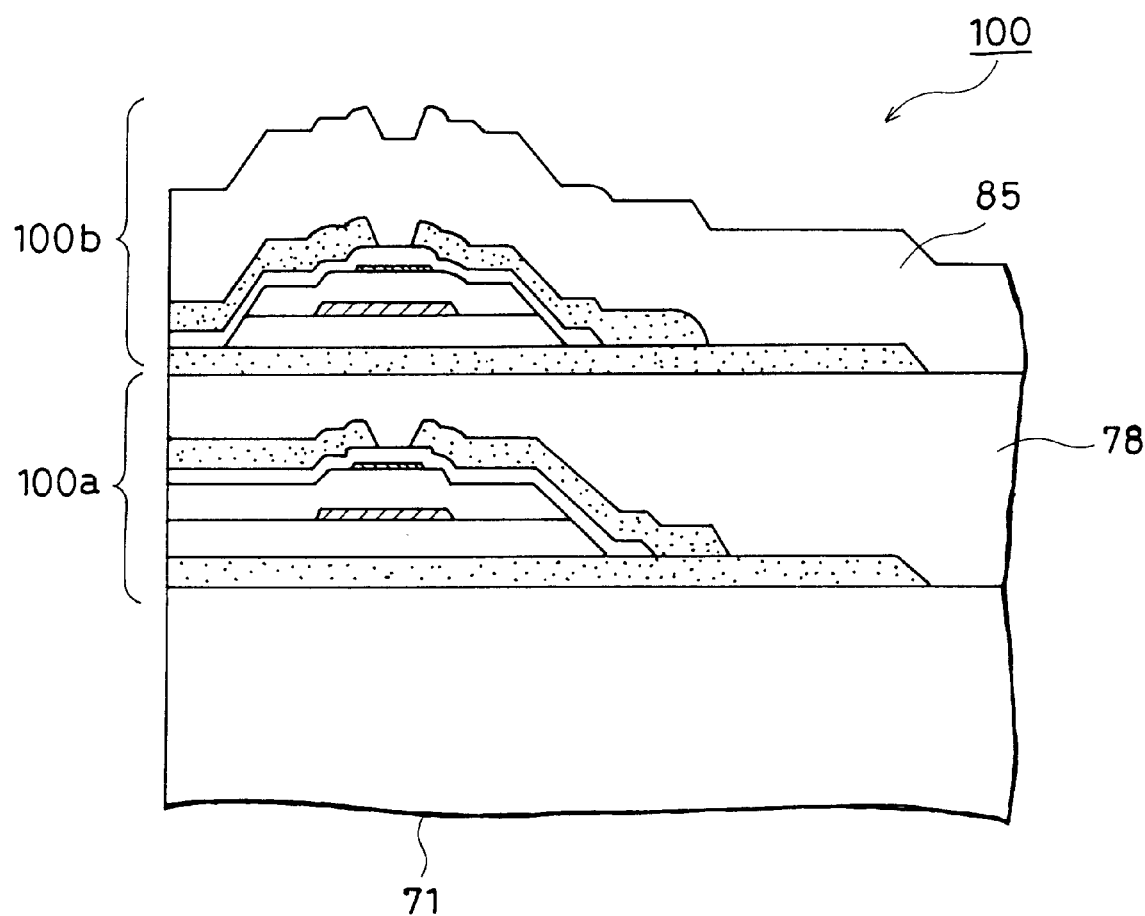
FIG. 16 is a cross sectional view of a combined thin film magnetic head of the prior art.

A combined thin film magnetic head 205 in accordance with a sixth embodiment of the present invention will be described with reference to FIGS. 10 and 11. The combined thin film magnetic head 205 of this embodiment includes a thin film magnetic head 205a for reproducing and a thin film magnetic head 205b for reproducing provided on the same substrate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A combined thin film magnetic head comprising:

a first yoke magnetic head; and a second yoke magnetic head having at least a portion of a recording and reproducing track overlapped with the first yoke magnetic head and having longer recording and reproducing track width than said first yoke magnetic head formed on the same substrate, wherein said first yoke type magnetic head includes;

a first lower yoke of a magnetic thin film formed approximately parallel to the surface of the substrate;

a first interlayer insulating layer formed on an upper surface of the first lower yoke, a first electromagnetic transducing element provided on the first interlayer insulating layer, a second interlayer insulating layer formed on the first electromagnetic transducing element, and a first upper yoke of a magnetic thin film formed along an upper surface of the second interlayer insulating layer, said first upper yoke and said first lower yoke at a front end portion providing a first front gap, in use to be in contact with a magnetic recording medium, for picking up magnetic flux of the magnetic recording medium; and wherein a second lower yoke formed on a surface of said substrate, opposing to said first lower yoke with a third interlayer insulating film interposed and extending at a distance behind said first lower yoke with a surface which is in contact in use with and sliding relative to a magnetic recording medium at a front end, a fourth interlayer insulating layer formed to have approximately trapezoidal cross section at a region behind said first lower yoke on an upper surface of said third interlayer insulating layer, a second electromagnetic transducing element provided on the fourth interlayer insulating layer, a fifth interlayer insulating layer formed on the second electromagnetic transducing element and a second upper yoke of a magnetic thin film formed along an upper surface of the fifth interlayer insulating layer, said first upper yoke and said second upper yoke being formed of the same layer of magnetic thin film; and wherein said second yoke magnetic head includes an upper yoke provided by combining magnetically said first lower yoke and said second upper yoke, said first lower yoke and said second lower yoke opposing with each other with said third interlayer insulating layer interposed as a gap layer at a front end serving as a surface which in use is in contact with and sliding relative to a magnetic recording medium, thus providing a second front gap picking up magnetic flux of the magnetic recording medium, and a trench portion having a prescribed depth formed in a substrate on which said combined thin film magnetic head is formed at a region immediately below said first yoke magnetic head and said second yoke magnetic head, wherein said second lower yoke is formed along the bottom portion of said trench portion.

2. A combined thin film magnetic head comprising:

a first yoke magnetic head; and a second yoke magnetic head having at least a portion of a recording and reproducing track overlapped with the first yoke magnetic head and having longer recording and reproducing track width than said first yoke magnetic head formed on the same substrate, of magnetic ferrite wherein said first yoke type magnetic head includes a first lower yoke of a magnetic thin film formed approximately parallel to the surface of the substrate;

a first interlayer insulating layer formed on an upper surface of the first lower yoke, a first electromagnetic transducing element provided on the first interlayer insulating layer, a second interlayer insulating layer formed on said first electromagnetic transducing element, and a first upper yoke of a magnetic thin film formed along an upper surface of the second interlayer insulating layer and said first upper yoke and said first lower yoke at a front end portion providing a surface to be in contact with and sliding relative to a magnetic recording medium to provide a first front gap for picking up magnetic flux of the magnetic recording medium, and wherein said second yoke magnetic head includes a third interlayer insulating film formed on a surface of said substrate interposed and extending along behind said first lower yoke with a surface which in use is in tact with and slidable relative to a magnetic recording medium at a front end, a fourth interlayer insulating layer formed to have approximately trapezoidal cross section at a region behind said first lower yoke on an upper surface of said third interlayer insulating layer, a second electromagnetic transducing element provided on the fourth interlayer insulating layer, a fifth interlayer insulating layer formed on the second electromagnetic transducing element, and a second upper yoke of a magnetic thin film formed along an upper surface of the fifth insulating layer, said first upper yoke and said second upper yoke being formed of the same layer of magnetic thin film; and wherein said second yoke magnetic head includes an upper yoke provided by combining said first lower yoke and said second upper yoke, said first lower yoke and said substrate opposing at a front end serving as a surface which in use is in contact with and sliding relative to a magnetic recording medium, thus providing a second front gap picking up magnetic flux of the magnetic recording medium, and a trench portion having a prescribed depth formed in the substrate, on which said combined thin film magnetic head is formed, at a region immediately below said first yoke magnetic head and said second yoke magnetic head wherein at least one non-magnetic body selected from the group consisting of glass, $SiO_2$, $Al_2O_3$, and polyimide and photo-resist is filled in the trench portion.

3. The combined thin film magnetic head according to claim 2, wherein the third insulating layer is on and in direct contact with the non-magnetic body.

* * * * *